3,087,852
CATIONIC POLYMERIC DIALDEHYDES AND THEIR USE IN MAKING WET STRENGTH PAPER
Bernard T. Hofreiter, George Earle Hamerstrand, and Charles L. Mehltretter, all of Peoria, Ill., assignors to the United States of America as represented by the Secretary of Agriculture
No Drawing. Filed Mar. 29, 1961, Ser. No. 99,323
4 Claims. (Cl. 162—175)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to improvements in the production of high wet-strength paper. More particularly this invention relates to a process for making paper wherein an improved composition is employed as an additive to cellulose pulp in aqueous slurry prior to web formation.

Heretofore polymeric dialdehydes prepared by periodate oxidation of starch have been used for imparting wet strength to paper. In the copending application of Swanson et al. S.N. 779,036, filed December 8, 1958, it is disclosed that the polymeric dialdehyde produced by an essentially complete periodate oxidation of starch (and called dialdehyde starch for convenience) is highly effective in increasing the wet-strength of paper when used as a tub size. The tub-sizing method is inherently troublesome, however, mainly because it involves an additional step after the paper is formed, and it requires the evaporation of large quantities of water after application. It was found, moreover, that the product (dialdehyde starch) prepared by essentially complete periodate oxidation of starch lacks the property of high substantivity to cellulosic fibers, and that sufficient of this material cannot be deposited on the cellulosic fibers when used alone as a wet-end additive rather than as a tub-sizing agent to produce satisfactory wet-strength paper. In our copending patent applications S.N. 858,836, filed December 10, 1959, now U.S. Patent No. 3,062,703, and S.N. 17,438, filed March 24, 1960, now U.S. Patent No. 3,067,088, we have disclosed the preparation of paper having high wet strength by the wet-end addition of polymeric dialdehydes prepared by essentially complete periodic acid oxidation of starch to cellulosic fibers in conjunction with respective essential retention agents such as alum and cationic starches. Efficient deposition and retention of the wet strength-conferring dialdehyde polymer on the cellulosic fiber prior to sheet formation is thus obtained without a subsequent tub-sizing operation on the previously formed individual sheets.

An object of this invention is to provide further improvements in the production of polymeric dialdehydes which are of value for imparting wet strength to paper. Another object of this invention is to provide relatively stable modified polymeric dialdehyde compositions which are effective for improving wet-strength when employed as beater or wet-end additives to cellulose fibers without the need of a precipitating or retention agent.

It has now been discovered in accordance with this invention that paper having high wet-strength can be prepared directly from the cellulosic fibers by treating the fibers at the wet-end with our novel polymeric dialdehydes which contain tertiary nitrogen or quaternary ammonium moieties in their structure. Our novel cationic nitrogen-containing polymeric dialdehydes are water dispersible and have a positive charge. One class of our modified polymeric dialdehydes containing tertiary amine substitution has the general chemical formula

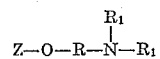

wherein Z is the radical of a monomeric unit in dialdehyde stach

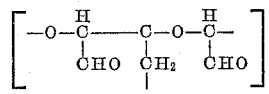

R is an ether-linked alkylene or hydroxyalkylene radical, and $R_1$ is methyl or ethyl. A thereinunder sub-genus of our nitrogen-containing polymeric dialdehydes contains quaternary nitrogen substituents and has the general formula

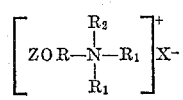

wherein Z is the aforesaid dialdehyde starch radical, R is an ether-linked alkylene or hydroxyalkylene radical, $R_1$ is selected from the group consisting of methyl and ethyl, $R_2$ is an alkyl radical containing up to 18 carbon atoms and X is an anion selected from the group consisting of chloride, bromide, iodide, and sulfate.

However, our invention broadly pertains to all cationic tertiary and quaternary nitrogen-containing polymeric dialdehydes in which the nitrogen-containing substituent is attached to the polymeric dialdehyde through an ether linkage and in which the polymeric dialdehyde is produced by essentially complete periodic acid oxidation of the corresponding nitrogen containing polysaccharide ether.

The nitrogen-containing starch ethers used as starting materials or intermediates in preparing our novel cationic polymeric dialdehydes are known and may be prepared by the procedures disclosed in U.S. Patent No. 2,813,093 of Caldwell et al. and 2,876,217 of Paschall. For example, Paschall prepares quaternary nitrogen starch ethers through reaction of a tertiary amine with epichlorohydrin to produce a first intermediate

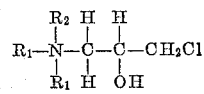

(wherein $R_1$ and $R_2$ have the previously assigned values) which is further reacted with starch. This is a general process for making nitrogen-substituted starch ethers and is obviously applicable to the production of tertiary amino starch ethers, and is encompassed in the general formula for the tertiary amino polymeric dialdehydes of our invention. Although the aforementioned prior art nitrogen-containing starch ethers are cationic and substantive to the negatively charged cellulosic fibers when employed as a beater additive prior to sheet formation, they impart only an improved dry strength unaccompanied by any noticeable increase in wet strength. A further object of this invention therefore is to modify the above prior art cationic starches in such a way as to retain their substantivity for cellulosic fibers at the beater or wet-end and their necessary water dispersibility while imparting the ability to confer highly valuable wet strength properties thereto.

Briefly, according to the present invention, the above prior art nitrogen-containing starch ether intermediates are slurried in water and a calculated amount of periodic acid or sodium metaperiodate is added to obtain essentially complete oxidation of the free $C_2$ and $C_3$ hydroxyl groups to aldehyde groups in the said starch ether. The reaction is preferably carried out at a temperature below 50° C. to prevent degradation and also gelatinization of the product. The insoluble modified nitrogen-containing polymeric dialdehyde obtained in granular form is readily filtered, washed with water and dried. The white products are stable at a pH of about 4–7 at room temperature, and are readily dispersible in hot water. They are cationic in nature and dispersions thereof are strongly substantive to cellulose fibers at the beater.

The nitrogen-containing polymeric dialdehydes of our invention are chiefly useful for application to cellulose fibers to form wet-strength paper for toweling, wrapping paper, paper bags, and the like.

The application of our novel non-thermosetting products to an aqueous suspension of cellulose fibers is different from the method used with the non-nitrogenous polymeric dialdehydes of our copending applications. The products of this invention are readily dispersed by heating in 3 percent concentration in water to about 90° C. for about 30 minutes and are then added to the aqueous pulp preferably in the pH range of 4 to 6 in the amount of about 5 percent of the dry weight of the fibers before web formation. Preferably the pulp is well hydrated as this promotes rapid adsorption and increases the adsorptive capacity of the fibers. The consistency of the pulp is not critical and is about 0.5 percent. The air-dried paper obtained has immediate high wet-strength and does not require a heat-cure for its development. A paper of markedly improved wet-strength is obtained when as little as 0.5 percent of product is adsorbed, based on the dry weight of the fibers.

Although our exemplary quaternary ammonium starch ethers contain an alkyl radical derived from a long chain fatty acid, it is apparent that the substitution therefor of methyl or ethyl would provide cost benefits and an even greater substantivity through the smaller size of the polymer unit.

The invention is further illustrated by the following examples.

Example 1

To 150 parts of an aqueous solution containing 4.2 parts of sodium hydroxide and 33.4 parts of anhydrous sodium sulfate was added 100 parts of corn starch (dry basis) and the mixture adequately stirred. After several minutes 2.9 parts of β-dimethylamino ethyl chloride hydrochloride dissolved in 20 parts of water was gradually added to the starch slurry over a 10-minute period and the reaction carried out for a total of 19 hours at room temperature. The reaction slurry was neutralized to pH 6.1 by addition of 6 N sulfuric acid. The product was then filtered and washed with water to give a starch ether of the formula Starch-O—$C_2H_4N(CH_3)_2$.

Ten parts of the above cationic starch ether (dry basis) was stirred in 50 parts of water. Then 125 parts of an aqueous solution containing 15.84 parts of sodium metaperiodate was introduced gradually and allowed to react for 16 hours at room temperature. The tertiary nitrogen-containing polymeric dialdehyde produced was filtered, washed with water, and dried. The white product corresponding to the formula

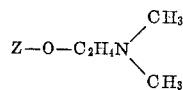

wherein Z is the radical of a monomeric unit in dialdehyde starch contained 0.15 percent nitrogen, equivalent to a degree of substitution of 0.017.

Example 2

Ten parts of commercial dimethyl coconut oil amine, 3.8 parts of epichlorohydrin and 10 parts of diethyl ether were refluxed for about 5 hours. To the cooled turbid reaction mixture was added several volumes of diethyl ether to precipitate the reaction product. The quaternary ammonium reaction product was filtered, washed with diethyl ether and dried. Then 3.4 parts of the above quaternary ammonium reaction product was dissolved in dilute alkali and added to 10 parts of unmodified starch slurried in 23 parts of an alkaline solution and the reaction carried out at 40° C. for 17 hours. The final reaction mixture had a pH of 11.2 and was adjusted to pH 4 with 6 N sulfuric acid. The mixture was diluted with water and the product removed by filtration. It was then washed several times with water to pH 5.2, followed by one wash with 95 percent ethanol and dried. The quaternary ammonium starch ether corresponding to the formula

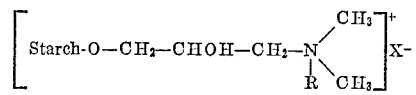

wherein R is a radical containing not above 18 carbon atoms and X is sulfate, was white and easy to handle.

55 parts of an aqueous solution containing 9.8 parts of sodium metaperiodate was added slowly to 5 parts of the above quaternary ammonium starch ether (dry basis) slurried in 10 parts of water. During this addition the temperature was kept at 42° C. The reaction was then continued at room temperature for a total period of about 19 hours. The product was separated by centrifugation and washed with water and finally with ethanol. The product was air dried and contained 0.11 percent nitrogen (dry basis), equivalent to a degree of substitution of 0.013.

Example 3

Twenty parts of dimethyl stearyl amine and 6.9 parts of epichlorohydrin were added to 150 parts of water and stirred for 20 hours at room temperature. The solution was concentrated in vacuo to a thick sirup. Sixty parts of the sirup (12 parts dry basis) were stirred with 25 parts of starch slurried in 200 parts of water and dilute sodium hydroxide solution was added to maintain the slurry alkaline. The reaction mixture was stirred for several days at 40° C. The quaternary ammonium starch product was filtered, washed with water and ethanol and dried.

Seven parts of the quaternary ammonium starch ether was slurried in 50 parts of water containing 10 parts of sodium metaperiodate and stirring for 20 hours at room temperature. The quaternary ammonium polymeric dialdehyde product was isolated by filtration, washed first with water and then with ethanol, and dried. The product contained 0.16 percent nitrogen (dry basis), equivalent to a degree of substitution of 0.018.

Example 4

To determine the effect of the introduction of a cationic nitrogen moiety into a polymeric dialdehyde on the affinity of cellulosic fibers for the polymeric dialdehyde, the following experiments were performed and compared. In a first control experiment, 30 g. of bleached sulfate pulp (S.R. freeness 700 ml.) was slurried in 2 liters of water which contained 50 ml. of a dispersion of chemically unmodified polymeric dialdehyde (dialdehyde starch) dispersed by heating 1.5 g. of the dialdehyde starch in 50 ml. of water for 2½ hours at about 95° C. and cooling. The pulp was dispersed in a pulp disintegrator for 15 minutes and then further diluted to a total volume of 8 liters. Handsheets were prepared from the resulting furnish. The weight of unmodified polymeric dialdehyde (dialdehyde starch) adsorbed by the cellulose fibers was only 0.16 percent of the dry pulp weight. The tensile wet strength of the paper expressed as breaking length after a 30-minute soak in water at 25° C. was 0.37 km. (1.38 lbs./inch). In the second experiment the same amount of bleached sulfate pulp was used under conditions similar to those used in the control experiment except for the substitution of the quaternary ammonium polymeric dialdehyde of Example 3 for the unmodified polymeric dialdehyde. Analysis of the handsheets that were prepared showed that the weight of our novel quaternary ammonium polymeric dialhehyde adsorbed was 1.3 percent of the weight of the dry pulp. The wet tensile strength of the paper was 0.60 km. (2.24 lbs./inch). These experiments show that while retention of unmodified polymeric dialdehyde by the cellulose fibers was only 3 percent (i.e., 3 percent of the polymeric dialdehyde used was adsorbed) the adsorption was increased to about 26 percent (substantially a nine fold increase) by introduction of a cationic nitrogen moiety into the polymeric dialdehyde as represented by the cationic polymeric dialdehyde of Example 3. Because of this increased efficiency of retention of the cationic polymeric dialdehyde the wet strength of the paper prepared with it was 62 percent greater than the wet strength of the paper prepared with unmodified polymeric dialdehyde.

A further comparison was made with handsheets prepared after slurrying 30 g. of the bleached sulfate pulp in 2 liters of water containing 50 ml. of a 3 percent dispersion of the unoxidized prior art quaternary ammonium starch ether intermediate of Example 3. The weight of the unoxidized quaternary ammonium starch ether intermediate adsorbed on the fibers was found to be 2.75 percent of the dry pulp weight. The wet tensile strength of these hand sheets after soaking in water at 25° C. for 30 min. was only 0.26 km. (0.97 lb./inch), compared with the above value of 0.60 km. (2.24 lbs./inch) for our product, a superiority of 170 percent greater wet strength with only half as much wet strength additive on the fibers.

*Example 5*

Thirty grams of bleached sulfate pulp (S.R. freeness 700 ml.) were slurried in 2 liters of water which contained 50 ml. of a dispersion of the novel tertiary nitrogen cationic polymeric dialdehyde of Example 1 which had been dispersed by heating 1.5 g. of the said cationic polymeric dialdehyde in 50 ml. of water at about 95° C. for one hour and cooling. The pulp was dispersed in a pulp disintegrator for 15 minutes and then further diluted to a volume of 8 liters. Handsheets prepared from the resulting furnish were found to contain 0.48 percent of the cationic product based on the weight of the dry pulp. The wet strength of the paper expressed as breaking length was 0.44 km. (1.64 lbs./inch). These results are compared with those obtained with paper prepared with the same amount of unmodified polymeric dialdehyde as illustrated in the control experiment of Example 4. The efficiency of retention of our cationic dialdehyde product was about 10 percent compared to 3 percent for the unmodified polymeric dialdehyde. Also the wet strength of the cationic polymeric dialdehyde treated paper was about 20 percent greater than that for paper prepared with the same amount of unmodified polymeric dialdehyde.

We claim:

1. Polymeric nitrogenous dialdehydes having substituted monomeric units that conform to the formula

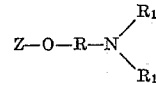

where Z is the radical of a monomeric unit in dialdehyde starch moiety, R is a member selected from the group consisting of hydroxyalkylene and alkylene in ether linkage with Z, and $R_1$ is selected from the group consisting of methyl and ethyl.

2. Compositions of matter especially suitable for the manufacture of paper and felted cellulosic materials that are characterized by having high wet strength, said compositions comprising an aqueous dispersion of cellulosic fibers having adsorbed thereon, from 0.5 percent to 5 percent based on the dry weight of the fibers of a polymeric nitrogenous dialdehyde as defined in claim 1.

3. Polymeric quaternary ammonium dialdehydes having substituted monomeric units that conform to the formula

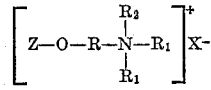

wherein Z is the radical of a monomeric unit in dialdehyde starch moiety, R is a member selected from the group consisting of hydroxyalkylene and alkylene, $R_1$ is selected from the group consisting of ethyl and methyl, $R_2$ is an alkyl radical containing up to 18 carbon atoms, and X is an anion selected from the group consisting of chloride, bromide, iodide, and sulfate.

4. Compositions of matter especially suitable for the manufacture of paper and felted cellulosic materials that are characterized by having high wet strength, said compositions comprising an aqueous dispersion of cellulosic fibers having adsorbed thereon from 0.5 percent to 5 percent based on the dry weight of the fibers of a polymeric quaternary ammonium dialdehyde as defined in claim 3.

References Cited in the file of this patent

UNITED STATES PATENTS

| | | |
|---|---|---|
| 2,880,236 | Mehltretter et al. | Mar. 31, 1959 |
| 2,894,945 | Hofrieter et al. | July 14, 1959 |
| 2,935,436 | Caldwell et al. | May 3, 1960 |
| 2,995,513 | Paschall et al. | Aug. 8, 1961 |

OTHER REFERENCES

TAPPI, Meller, vol. 41, No. 11, November 1958, pages 684–686. (Copy in Scientific Library.)